(12) United States Patent
Gu

(10) Patent No.: US 10,970,566 B2
(45) Date of Patent: Apr. 6, 2021

(54) LANE LINE DETECTION METHOD AND APPARATUS

(71) Applicant: BOE Technology Group Co., Ltd., Beijing (CN)

(72) Inventor: Yu Gu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 62 days.

(21) Appl. No.: 16/398,700

(22) Filed: Apr. 30, 2019

(65) Prior Publication Data

US 2020/0026930 A1 Jan. 23, 2020

(30) Foreign Application Priority Data

Jul. 20, 2018 (CN) .......................... 201810805059.6

(51) Int. Cl.
*G06K 9/00* (2006.01)
*G06K 9/46* (2006.01)

(52) U.S. Cl.
CPC .......... *G06K 9/00798* (2013.01); *G06K 9/46* (2013.01)

(58) Field of Classification Search
CPC .... G06K 9/00798; G06K 9/46; G06K 9/3233; G06K 9/4604; G06K 9/6218; G06K 9/4671
See application file for complete search history.

(56) References Cited

U.S. PATENT DOCUMENTS

| | | | | |
|---|---|---|---|---|
| 9,389,311 B1* | 7/2016 | Moya | ................... | G06K 9/0063 |
| 2008/0317282 A1* | 12/2008 | Unoura | .............. | G06K 9/00798 |
| | | | | 382/103 |
| 2009/0028388 A1* | 1/2009 | Amagasaki | ........ | G06K 9/00798 |
| | | | | 382/104 |
| 2010/0002911 A1* | 1/2010 | Wu | ........................ | B60W 30/12 |
| | | | | 382/104 |
| 2012/0166033 A1* | 6/2012 | Byun | .................... | G05D 1/0246 |
| | | | | 701/23 |
| 2013/0266175 A1* | 10/2013 | Zhang | ..................... | G06T 7/181 |
| | | | | 382/103 |
| 2014/0119656 A1* | 5/2014 | Lilje | ........................ | G06T 7/12 |
| | | | | 382/173 |

(Continued)

FOREIGN PATENT DOCUMENTS

| CN | 104992145 A | 10/2015 |
|---|---|---|
| CN | 105005771 A | 10/2015 |

(Continued)

OTHER PUBLICATIONS

Agrawal et al., "Off-Road Lane Detection Using Superpixel Clustering and RANSAC Curve Fitting", 2018 15th Internation Conference on Control, Automation, Robotics and Vision (ICARCV), Nov. 18-21, 2018 (Year: 2018).*

(Continued)

*Primary Examiner* — Aaron W Carter
(74) *Attorney, Agent, or Firm* — Nath, Goldberg & Meyer; Joshua B. Goldberg

(57) ABSTRACT

The present disclosure provides a lane line detection method and apparatus. The lane line detection method is applicable for an in-vehicle device and includes: determining a region of interest in an image to be detected; extracting lane line pixel features in the region of interest; combining similar lane line pixel features to generate a superpixel corresponding to the combined lane line pixel features; and performing a clustering and fitting process for respective superpixels to obtain a target lane line.

16 Claims, 5 Drawing Sheets

(56) References Cited

U.S. PATENT DOCUMENTS

| | | | |
|---|---|---|---|
| 2014/0285662 A1* | 9/2014 | Murashita | G06K 9/4604 348/148 |
| 2015/0187070 A1* | 7/2015 | Cheng | G06K 9/00617 382/128 |
| 2016/0048733 A1* | 2/2016 | Jung | G06K 9/00798 382/104 |
| 2016/0267331 A1* | 9/2016 | Pillai | G06K 9/00805 |
| 2017/0313312 A1* | 11/2017 | Park | B60W 30/165 |
| 2018/0197021 A1 | 7/2018 | Lee | |
| 2018/0204073 A1* | 7/2018 | Kawano | G06T 7/74 |
| 2019/0019041 A1* | 1/2019 | Ding | G06K 9/6227 |
| 2019/0026900 A1* | 1/2019 | Fergie | G06T 7/90 |
| 2019/0042888 A1* | 2/2019 | Tsutsui | G06N 3/08 |
| 2019/0295241 A1* | 9/2019 | Gu | G06K 9/38 |
| 2020/0026930 A1* | 1/2020 | Gu | G06K 9/00798 |
| 2020/0105017 A1* | 4/2020 | Gu | G06K 9/38 |

FOREIGN PATENT DOCUMENTS

| | | |
|---|---|---|
| CN | 105160309 A | 12/2015 |
| CN | 105930800 A | 9/2016 |
| CN | 107767383 A | 3/2018 |
| CN | 108038416 A | 5/2018 |
| CN | 108154114 A | 6/2018 |
| CN | 108205667 A | 6/2018 |

OTHER PUBLICATIONS

Wang et al., "Road Detection via Superpixels and Interactive Image Segmentation", The 4th Annual IEEE International Conference on Cyber Technology in Automation, Control and Intelligent Systems, Jun. 4-7, 2014 (Year: 2014).*

Xiao et al., "Road Detection Based on Superpixels and Anisotropic Heat Diffusion", 2014 (Year: 2014).*

Office Action dated May 7, 2020 issued in corresponding Chinese Application No. 201810805059.6.

Feng, et al., "Lane line recognition algorithm based on super--pixel and anisotropic diffusion", Laser Journal, vol. 36, No. 4, 2015.

Du, et al., "Vision-based approach towards lane line detection and vehicle localization", Machine Vision and Applications, vol. 27, pp. 175-191, 2016.

* cited by examiner

LANE LINE DETECTION METHOD AND APPARATUS

CROSS-REFERENCE TO RELATED APPLICATION

This application claims priority from Chinese patent application No. 201810805059.6 filed with the China National Intellectual Property Administration on Jul. 20, 2018, the disclosure of which is incorporated herein by reference in its entirety.

TECHNICAL FIELD

The present disclosure relates to the field of intelligent transportation, and particularly relates to a lane line detection method and apparatus.

BACKGROUND

With the rapid development of vehicle assisted driving and unmanned vehicle technology, whether a machine vision sensor can accurately obtain signs, marks or lane line information around the vehicle becomes the most important part of an vehicle assisted driving system in which a real-time detection and warning technology of the lane line guarantees that various vehicles run on their own lanes, and plays an important role in deviation warning and lane keeping.

Current lane line detection methods mainly depends on an assumption that the lane lines are parallel, or the lane line or road model is required to be known in advance. These methods perform well on highways, but in an urban environment, for example, in case of intersecting, branched, merged lane lines or the like, these methods tend to miss detection. Moreover, when a vehicle in front comes too close, it will also cause interference with the lane line detection of the current lane, resulting in false detection of the lane line.

SUMMARY

The present disclosure has been accomplished in order to solve at least part of the problems in the related art. The present disclosure provides a lane line detection method and apparatus.

According to an aspect of the present disclosure, there is provided a lane line detection method applicable for an in-vehicle device and including:
  determining a region of interest in an image to be detected;
  extracting lane line pixel features in the region of interest;
  combining similar lane line pixel features to generate a superpixel corresponding to the combined lane line pixel features; and
  performing a clustering and fitting process for respective superpixels to obtain a target lane line.

In some embodiments, the step of determining the region of interest in the image to be detected includes:
  setting a lane line processing region around the in-vehicle device;
  determining coordinate values of a midpoint on each of boundary lines of the lane line processing region in a real coordinate system in which the in-vehicle device is located;
  converting each of the coordinate values into a corresponding image coordinate value in an image coordinate system corresponding to the image to be detected; and
  determining the region of interest in the image to be detected according to the respective image coordinate values.

In some embodiments, the step of extracting the lane line pixel features in the region of interest includes:
  selecting a first edge image and a second edge image in the region of interest;
  performing a binarization process for each of the first edge image and the second edge image to obtain a first binarized edge image and a second binarized edge image; and
  perform a row scanning for each of the first binarized edge image and the second binarized edge image, and obtaining a first lane line pixel feature point and a second lane line pixel feature point in respective rows.

In some embodiments, the step of combining the similar lane line pixel features to generate the superpixel corresponding to the combined lane line pixel features includes:
  copying and saving the first lane line pixel feature point and the second lane line pixel feature point into a new image to obtain a lane line feature map when a distance between the first lane line pixel feature point and the second lane line pixel feature point satisfies a set distance threshold;
  searching for a superpixel feature from an edge position of the lane line feature map, and using a first found superpixel feature as a superpixel feature reference point;
  finding similar features to the superpixel feature reference point within a candidate range of the superpixel feature reference point; and
  combining the superpixel feature reference point with the found similar features to generate the superpixel.

In some embodiments, the step of performing the clustering and fitting process for the respective superpixels to obtain the target lane line includes:
  performing a clustering process for the respective superpixels to obtain a plurality of candidate lane lines;
  calculating a length value of each of the candidate lane lines; and
  performing a quadratic curve fitting for each of the candidate lane lines whose length value is greater than a set threshold to obtain a target lane line.

In some embodiments, the binarization process includes comparing pixel values of the first edge image and the second edge image to a pixel threshold which is associated with positions of the pixels in the first edge image and the second edge image.

In some embodiments, the pixel threshold is also associated with a vertical gradient of the pixels in the first edge image and the second edge image.

In some embodiments, it is determined whether a distance value between the matched first and second lane line pixel feature points is between a first threshold and a second threshold that are associated with positions of the first lane line pixel feature point and the second lane line pixel feature point.

In some embodiments, the following sample distance metric formula is defined to perform the clustering and fitting process:

$$d(u_i, u_j) = \alpha \cdot abs(\theta_{ti} - \theta_{tj}) + \alpha \cdot abs(\theta_{mi} - \theta_{mj}) + \alpha \cdot abs(\theta_{bi} - \theta_{bj}) + \beta \cdot abs(t_i \cdot u - t_j \cdot u) + \beta \cdot abs(m_i \cdot u - m_j \cdot u) + \beta \cdot abs(b_i \cdot u - b_j \cdot u),$$

where $d(u_i, u_j)$ represents a distance between superpixels $u_i$ and $u_j$, $\theta_{ti}$ represents a gradient direction angle of a top pixel point ti of the superpixel $u_i$, $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents a gradient direction angle of a top pixel point tj of the superpixel $u_j$, $\theta_{mj}$ represents a gradient direction angle of a middle pixel point mj of the superpixel $u_j$, $\theta_{bj}$ represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

According to another aspect of the disclosure, there is provided a lane line detection apparatus, including:

a region of interest determining component configured to determine a region of interest in an image to be detected;

a pixel feature extracting component configured to extract lane line pixel features in the region of interest;

a superpixel generating component configured to combine similar lane line pixel features to generate a superpixel corresponding to the combined lane line pixel features; and a target lane line obtaining component configured to perform a clustering and fitting process for respective superpixels to obtain a target lane line.

In some embodiments, the region of interest determining component includes:

a processing region setting sub-component configured to set a lane line processing region around the in-vehicle device;

a coordinate value determining sub-component configured to determine coordinate values of a midpoint on each of boundary lines of the lane line processing region in a real coordinate system in which the in-vehicle device is located;

an image coordinate value obtaining sub-component configured to convert each of the coordinate values into a corresponding image coordinate value in an image coordinate system corresponding to the image to be detected; and a region of interest determining sub-component configured to determine the region of interest in the image to be detected according to the respective image coordinate values.

In some embodiments, the pixel feature extracting component includes:

an edge image selecting sub-component configured to select a first edge image and a second edge image in the region of interest;

a binarization processing sub-component configured to perform a binarization process for each of the first edge image and the second edge image to obtain a first binarized edge image and a second binarized edge image; and a scan processing sub-component configured to perform a row scanning for each of the first binarized edge image and the second binarized edge image, and obtain a first lane line pixel feature point and a second lane line pixel feature point in respective rows.

In some embodiments, the superpixel generating component includes:

a lane line feature map obtaining sub-component configured to copy and save the first lane line pixel feature point and the second lane line pixel feature point into a new image to obtain a lane line feature map when a distance between the first lane line pixel feature point and the second lane line pixel feature point satisfies a set distance threshold;

a reference point selecting sub-component configured to search for a superpixel feature from an edge position of the lane line feature map, and use a first found superpixel feature as a superpixel feature reference point;

a finding sub-component configured to find similar features to the superpixel feature reference point within a candidate range of the superpixel feature reference point; and a superpixel generating sub-component configured to combine the superpixel feature reference point with the found similar features to generate the superpixel.

In some embodiments, the target lane line obtaining component includes:

a clustering and fitting processing sub-component configured to perform a clustering process for the superpixels to obtain a plurality of candidate lane lines;

a length value calculating sub-component configured to calculate a length value of each of the candidate lane lines; and a target lane line obtaining sub-component configured to perform a quadratic curve fitting for each of the candidate lane lines whose length value is greater than a set threshold to obtain a target lane line.

In some embodiments, the binarization processing sub-component is configured to compare pixel values of the first edge image and the second edge image to a pixel threshold which is associated with positions of the pixels in the first edge image and the second edge image.

In some embodiments, the lane line feature map obtaining sub-component is configured to determine whether a distance value between the matched first and second lane line pixel feature points is between a first threshold and a second threshold that are associated with positions of the first lane line pixel feature point and the second lane line pixel feature point.

In some embodiments, the clustering and fitting processing sub-component defines the following sample distance metric formula to perform the clustering and fitting process:

$$d(u_i, u_j) = \alpha \cdot abs(\theta_{ti} - \theta_{tj}) + \alpha \cdot abs(\theta_{mi} - \theta_{mj}) + \alpha \cdot abs(\theta_{bi} - \theta_{bj}) + \beta \cdot abs(t_i \cdot u - t_j \cdot u) + \beta \cdot abs(m_i \cdot u - m_j \cdot u) + \beta \cdot abs(b_i \cdot u - b_j \cdot u),$$

where $d(u_i, u_j)$ represents a distance between superpixels $u_i$ and $u_j$, $\theta_{ti}$ represents a gradient direction angle of a top pixel point ti of the superpixel $u_i$, $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents a gradient direction angle of a top pixel point tj of the superpixel $u_j$, $\theta_{mj}$ represents a gradient direction angle of a middle pixel point mj of the superpixel $\theta_{bi}$ represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

DETAILED DESCRIPTION

To improve understanding of the above objects, features and advantages, the present disclosure will now be described in detail in conjunction with accompanying drawings and specific embodiments.

Figure 1:
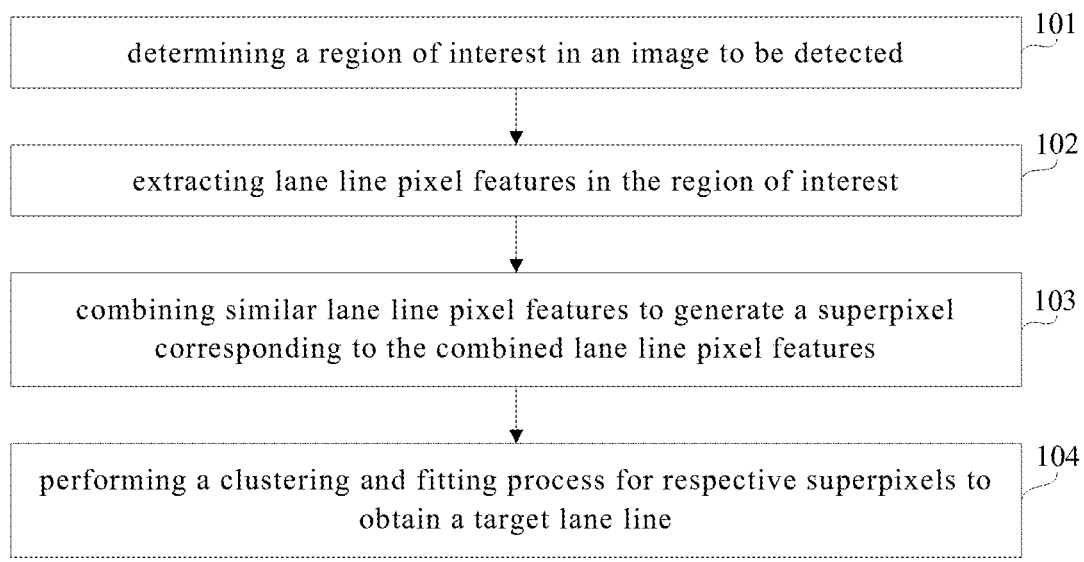
FIG. 1 is a flowchart showing steps of a lane line detection method according to an exemplary embodiment of the present disclosure.

FIG. 1 is a flowchart showing steps of a lane line detection method according to an exemplary embodiment of the present disclosure. As shown in FIG. 1, the lane line detection method may be applicable for an in-vehicle device, and may include the following steps:

Step 101: determining a region of interest in an image to be detected; The lane line detection method provided in an exemplary embodiment of the present disclosure may be applicable for real-time detection of a lane line in front of the in-vehicle device. The in-vehicle device may be a device installed at the front of the vehicle integrating photographing, analysis, or other functions; the specific devices are not limited herein.

The in-vehicle device may include an image capturing means, such as a camera, disposed at a vehicle head so that road conditions in the forward, left and right directions of the in-vehicle device are photographed in real time during running of the vehicle for subsequent real-time analysis of the lane line.

A Region of Interest (ROI) is an image region selected from an image serving as the focus of subsequent image analysis. The region is delineated for further processing. That is, the region of interest mentioned in the exemplary embodiment of the present disclosure is a region in an image to be detected that needs to be subjected to subsequent processing. By providing the region of interest, a processing time of image analysis can be reduced, and the analysis accuracy is increased.

The region of interest in the image to be detected may be obtained by setting a distance threshold. The manner of setting the region of interest in the image to be detected will be described in detail below, and will not be repeated in this exemplary embodiment of the present disclosure herein.

After the region of interest in the image to be detected is determined, step 102 is performed.

Step 102: extracting lane line pixel features in the region of interest.

After the region of interest in the image to be detected is determined, a lane line pixel feature may be extracted from the region of interest. For a certain row in the region of interest in the image to be detected, the lane line pixel feature is determined by a plurality of paired edge feature points, and for any lane line (such as curves, lines, double yellow lines, double white lines, etc.), the captured images all have edges and may be detectable through the paired edge feature points.

In an exemplary embodiment of the present disclosure, a directed edge extraction operator and a dual threshold binarization method including an adaptive threshold may be used to preprocess the region of interest in the image to be detected, so as to extract the lane line pixel feature. The specific process will be described in below and will not be repeated in this exemplary embodiment of the present disclosure herein.

After the lane line pixel feature in the region of interest is extracted, step 103 is performed.

Step 103: combining similar lane line pixel features to generate a superpixel corresponding to the combined lane line pixel features.

Superpixel refers to dividing an originally pixel-level image into a district-level image, and in an exemplary embodiment of the present disclosure, refers to combining a plurality of similar lane line pixel features as a superpixel for subsequent processing.

After the lane line pixel feature from the region of interest is extracted, similar lane line pixel features may be combined to generate a superpixel corresponding to the combined lane line pixel features. For example, the extracted lane line pixel features include A, B, C, D, E, F, G, H, I, J and K, where A, B, I, J and K are similar lane line pixel features, C, D, E and F are similar lane line pixel features, and G and H are similar lane line pixel features. Then, A, B, I, J and K are combined, C, D, E and F are combined, and G and H are combined, resulting in a superpixel corresponding to A, B, I, J and K, a superpixel corresponding to C, D, E and F, and a superpixel corresponding to G and H.

It is to be understood that the above examples are merely examples for better understanding of the aspects of the exemplary embodiments of the present disclosure, and are not intended to limit the present disclosure.

The specific process of combining similar lane line pixel features to generate a superpixel corresponding to the combined lane line pixel features will be described in detail below, and will not be repeated in this exemplary embodiment of the present disclosure herein.

After the superpixel corresponding to the combined lane line pixel features is generated, step 104 is performed.

Step 104: performing a clustering and fitting process for respective superpixels to obtain a target lane line.

After at least one superpixel is obtained, a clustering and fitting process may be performed for each superpixel by using a preset clustering method to obtain a target lane line.

The image to be detected adopted in the exemplary embodiment of the present disclosure is an original image directly captured by a photographing means. Subsequent analysis of the image is performed based on the original image, all lane line pixels are detected, and a difference between two adjacent frames of image data in the image to be detected is relatively small. Thus, no visual jitter is generated.

The lane line detection method provided in the exemplary embodiment of the present disclosure may be applicable for an in-vehicle device, and may determine a region of interest in an image to be detected, extract each lane line pixel feature in the region of interest, combine similar lane line pixel features to generate a superpixel corresponding to the combined lane line pixel features, and perform a clustering and fitting process for each superpixel to obtain a target lane line. The exemplary embodiment of the present disclosure generates the target lane line based on superpixels, which does not require any assumption about lane line and road models, and does not rely on the assumption of parallel lane lines; it may work robustly in an urban environment without interference with a front vehicle, thereby reducing a probability of missed or false detection during the lane line detection.

Figure 2:
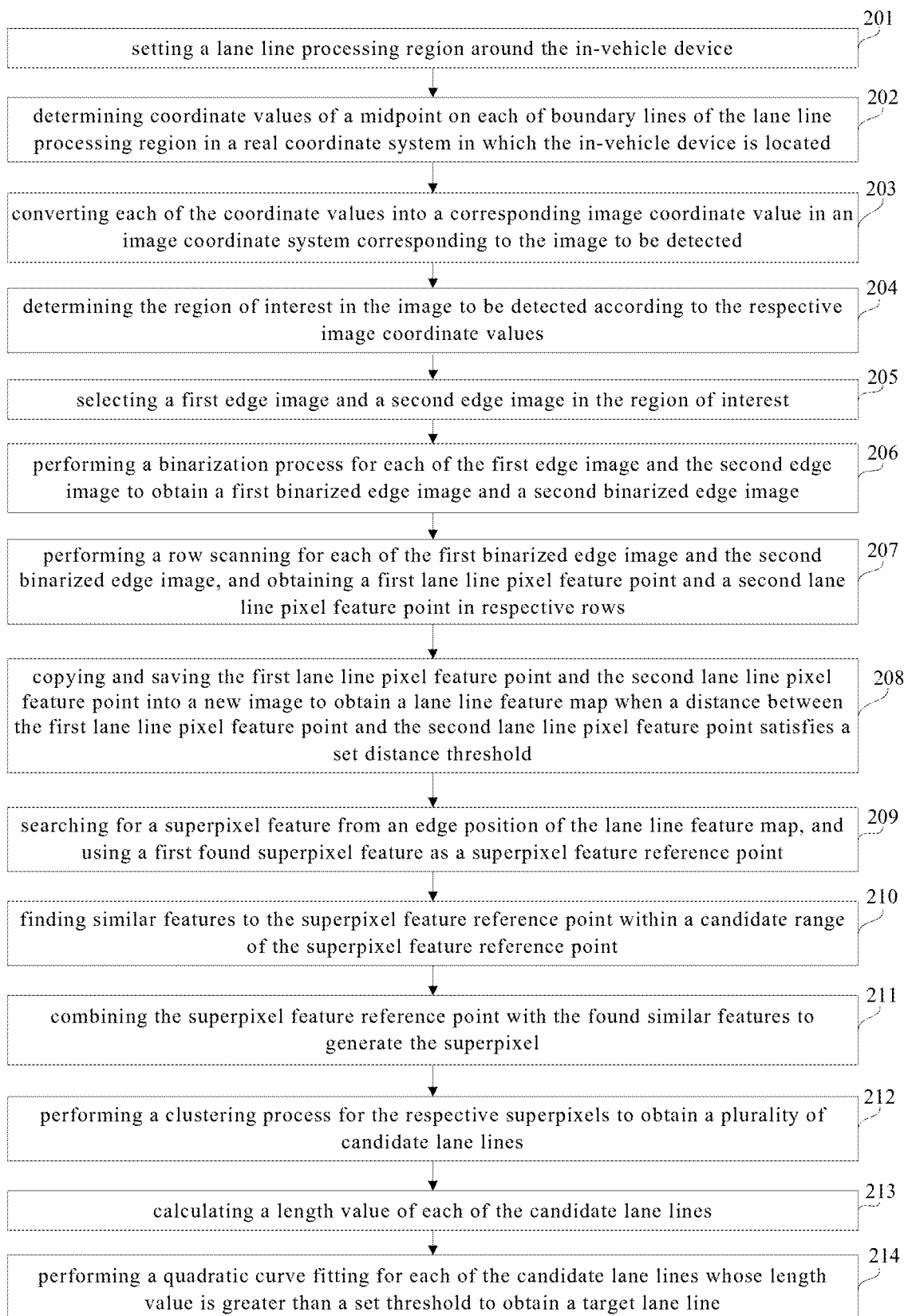
FIG. 2 is a flowchart showing specific steps of a lane line detection method according to an exemplary embodiment of the present disclosure.

FIG. 2 is a flowchart showing specific steps of a lane line detection method according to an exemplary embodiment of the present disclosure. As shown in FIG. 2, the lane line detection method may be applicable for an in-vehicle device, and may specifically include the following steps:

Step 201: setting a lane line processing region around the in-vehicle device.

Figure 3A:
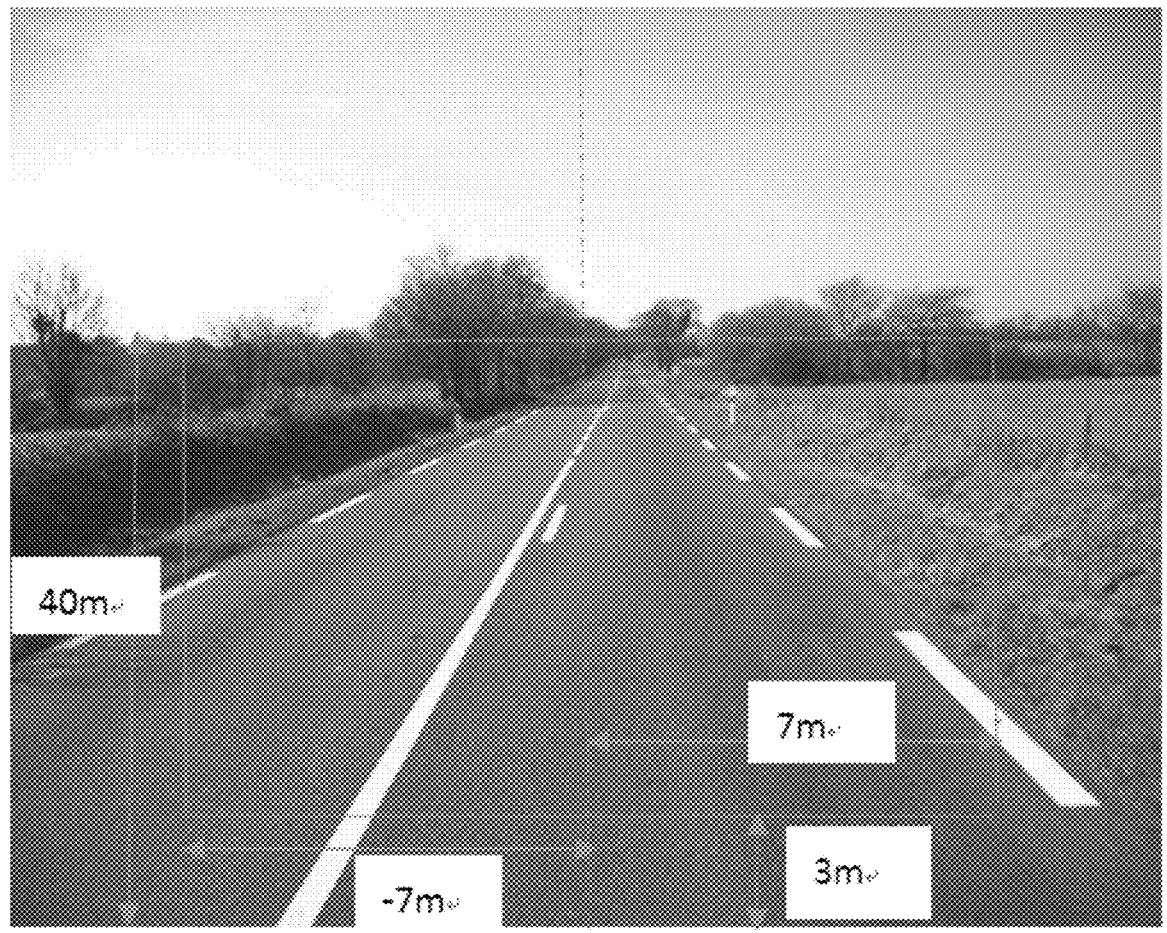
FIG. 3a is a schematic view showing settings of a lane line processing region according to an exemplary embodiment of the present disclosure.

In an exemplary embodiment of the present disclosure, a lane line processing region may be set around the in-vehicle device in advance. For example, referring to FIG. 3a, a schematic view showing settings of the lane line processing region according to an exemplary embodiment of the present disclosure is shown. As shown in FIG. 3a, the in-vehicle device is located at a bottom edge in FIG. 3a. With the in-vehicle device as a central coordinate, a front-rear direction of the in-vehicle device is set to be the Y-axis, a left-right direction thereof is set to be the X-axis, and a region 3 m-40 m away from the X-axis in front of the in-vehicle device (3 m is the determined closest detection distance in front of the in-vehicle device, and 40 m is the determined furthest detection distance in front of the vehicle equipment), and −7 m~7 m away from the Y-axis in the left-right direction of the in-vehicle device is set to be the lane line processing region, etc. The above four distance parameters may be used to determine the real detection range, that is, the lane line processing region. It can be understood that the above four distance parameters are exemplarily enumerated for illustrative purposes only, and those skilled in the art may arbitrarily set these distance parameters as needed. It is also to be understood that the above examples are merely examples for better understanding of the technical solutions of the present disclosure, and are not intended to limit the present disclosure.

The lane line processing region may be set by the system, and the specific setting process is not described in detail herein.

After the lane line processing region is set around the in-vehicle device, step 202 is performed.

Step 202: determining coordinate values of a midpoint on each of boundary lines of the lane line processing region in a real coordinate system in which the in-vehicle device is located.

The lane line processing region is preferably a rectangular region, that is, with the in-vehicle device as a central coordinate, the front-rear direction of the in-vehicle device is set to the Y-axis, the left-right direction thereof is set to be the X-axis, and a region formed with a first set distance value away from the X-axis and a second set distance value away from the Y-axis is set to be the lane line processing region.

After the lane line processing region is determined, a midpoint of each boundary line of the lane line processing region may be obtained, and coordinate values of the midpoint in the world coordinate system in which the in-vehicle device is located are determined.

After the coordinate values of the midpoint of each boundary line of the lane line processing region in the real coordinate system where the in-vehicle device is located is determined, step 203 is performed.

Step 203: converting each of the coordinate values into a corresponding image coordinate value in an image coordinate system corresponding to the image to be detected.

After the coordinate values of the midpoint of each boundary line of the lane line processing region in the real coordinate system where the in-vehicle device is located is determined, each of the coordinate values in the real coordinate system may be converted into the image coordinate system corresponding to the image to be detected so that each image coordinate value corresponding to the respective coordinate values are obtained.

Specifically, the coordinate value may be converted through the following formula (1):

$$\begin{bmatrix} u \\ v \\ 1 \end{bmatrix} = k \begin{bmatrix} fu & 0 & u0 \\ 0 & fv & v0 \\ 0 & 0 & 1 \end{bmatrix} \begin{bmatrix} R & T \\ 0 & 1 \end{bmatrix} \begin{bmatrix} X \\ Y \\ Z \\ 1 \end{bmatrix} \quad (1)$$

where $f_u$ and $f_v$ represent focal lengths of a sensor in directions u and v, respectively, u and v represent the abscissa and the ordinate of the image coordinate system, respectively, u0 and v0 represent optical center coordinates of the sensor, i.e., coordinates of a center point of the image to be detected, respectively, and R and T are set values obtained by parameter calibrations outside the camera.

It can be understood that X, Y, and Z in the above formula are coordinate values of a certain point in the world coordinate system, and R and T represent a rotation matrix and a translation matrix between the world coordinate system and the camera coordinate system, respectively.

By means of the above formula (1), the coordinate values of the midpoint of each boundary line of the lane line processing region in the real coordinate system where the in-vehicle device is located may be converted into the image coordinate system in which the image to be detected is located, and then the image coordinate values corresponding to the respective real coordinate values are obtained.

Generally in the art, in an image coordinate system, a point corresponding to an upper left corner of the image is taken as the origin of the image coordinate system. In an exemplary embodiment of the present disclosure, a point corresponding to the upper left corner of the image to be detected is taken as the origin of the image coordinate system.

After each image coordinate value is obtained, step 204 is performed.

Step 204: determining the region of interest in the image to be detected according to the respective image coordinate values.

A Region of Interest (ROI) is an image region selected from an image serving as the focus of subsequent image analysis. The region is delineated for further processing. That is, the region of interest mentioned in the exemplary embodiment of the present disclosure is a region in an image to be detected that needs to be subjected to subsequent processing. By providing the region of interest, a processing time of image analysis can be reduced, and the analysis accuracy is increased.

After the coordinate values of the lane line processing region in the real coordinate system in which the in-vehicle device is located are converted to the image coordinate system in which the image to be detected is located, and the image coordinate values corresponding to the respective coordinate values are obtained, the region to be processed of the image to be detected, i.e., the region of interest in the image to be detected, may be determined according to the image coordinate values. For example, the image coordinate values at left (i.e., left of the in-vehicle device), right (i.e., right of the in-vehicle device), top (i.e., a furthest position in front of the in-vehicle device) and bottom (i.e., a closest position in front of the in-vehicle device) sides of the region to be processed in the image to be detected are obtained. Thus, the region of interest in the image to be detected may be determined according to the above four image coordinate values.

In order to reduce interference from the complex surrounding environment with the lane line detection and improve the processing speed, a conventional method is to set a fixed region of interest before the feature extraction step, after which all the processing is performed only for the region of interest. This method requires constant debugging to get better parameters of the region of interest. Moreover, each time when a sensor for capturing an image is replaced, the parameters of the region of interest are required to be adjusted as the position of the lane line in different sensors is variable. In order to avoid such inconvenience, the method provided by the present disclosure sets the processing region to be a region 3 m-40 m in front and −7 m~7 m in the left-right direction of the vehicle, and the region of interest in the image may be automatically calculated by using the above steps. It is simple and time-saving to determine the region of interest using the method provided by the present disclosure.

After the region of interest in the image to be detected is determined, step 205 is performed.

It should be understood that the above steps 201 to 204 correspond to the step 101 described above, that is, the above steps 201 to 204 are subdivided steps of the step 101.

Step 205: selecting a first edge image and a second edge image in the region of interest.

In an exemplary embodiment of the present disclosure, a left filter and a right filter may be used to detect edges of regions of interest at left and right sides of the in-vehicle device, and obtain a left edge image and a right edge image, i.e., the first edge image and the second edge image.

The eigenvalues of the two filters may be expressed by the following formulas (2) and (3), respectively:

$$fl(u, v) = \sum_{i=0}^{i=wf/2} f(u+i) - \sum_{i=0}^{i=wf/2} f(u-i) \quad (2)$$

$$fr(u, v) = -\sum_{i=0}^{i=wf/2} f(u+i) + \sum_{i=0}^{i=wf/2} f(u-i) \quad (3)$$

Where $fl(u,v)$ represents an eigenvalue of the left filter, $fr(u,v)$ represents an eigenvalue of the right filter, $(u,v)$ represents a coordinate point with the in-vehicle device as the origin and the right/right direction of the in-vehicle device as the X-axis, $wf/2$ represents width parameters of the left/right filter, which can be set to be a set value.

The eigenvalue of the left/right filter may be expressed by the above formulas (2) and (3) respectively to filter the region of interest and thus obtain two edge images (i.e., the first edge image and the second edge image), and then obtain the lane line feature through the two edge images.

After the first edge image and the second edge image are selected, step 206 is performed.

Step 206: performing a binarization process for each of the first edge image and the second edge image to obtain a first binarized edge image and a second binarized edge image.

In an exemplary embodiment of the present disclosure, after the first edge image and the second edge image are obtained, the first edge image and the second edge image may be separately binarized to obtain a first binarized edge image corresponding to the first edge image and a second binarized edge image corresponding to the second edge image.

Specifically, the binarization process may be expressed by the following formulas (4) and (5):

$$I'_l(u, v) = \begin{cases} I_l(u, v), & if I_l(u, v) > T_l \\ 0, & \text{otherwise} \end{cases} \quad (4)$$

$$I'_r(u, v) = \begin{cases} I_r(u, v), & if I_r(u, v) > T_r \\ 0, & \text{otherwise} \end{cases} \quad (5)$$

Where $I_l(u,v)$ and $I_r(u,v)$ represent the pixel value of the first binarized edge image and the pixel value of the second binarized edge image, respectively, $T_l$ and $T_r$ represent the pixel thresholds of the first edge image and the second edge image, respectively, and $T_l$ and $T_r$ are not only related to a brightness value of the current pixel neighborhood, but also determined in combination with a vertical gradient of the pixels. That is, for a lane line, it has a larger horizontal gradient and a smaller vertical gradient, while for an interference factor, e.g., a vehicle or a rail, it has a larger vertical gradient. Therefore, by means of the gradient information, the present disclosure can better filter out interference caused by other factors. It should be understood that the binarization process herein is different from the conventional method of simply dividing a pixel value into only 0 and 255, but instead, dividing the pixel value into 0 and a plurality of values determined by the image pixel values and the set pixel thresholds.

Each pixel in the image corresponds to a threshold, and each pixel corresponds to a different threshold. For the first edge image and the second edge image, each pixel is compared with the corresponding threshold to generate a new first binarized edge image and a new second binarized edge image.

In this step, the binarization process includes comparing the pixel values of the first edge image and the second edge image to a pixel threshold which is associated with positions, vertical gradients, and brightness values of the neighborhood of the pixels in the first edge image and the second edge image.

For example, suppose the current pixel position is (u, v) and its pixel value is data(u, v), then the current pixel gradient is calculated as follows:

$$\Delta grad = \min(abs(data(u,v-width) - data(u,v)), abs(data(u-1,v-width) - data(u,v)), abs(data(u+1,v-width) - data(u,v))) \quad (6)$$

In the above formula (6), data(u,v) represents the pixel value of the point (u,v) in the image, and abs indicates calculating the absolute value. Minimum values of three gradients may be obtained by the above formula (6), the three gradients are: a gradient absolute value of the current pixel and an upper left adjacent pixel, a gradient absolute value of the current pixel and an upper adjacent pixel, and a gradient absolute value of the current pixel and an upper right adjacent pixel. In the exemplary embodiment of the present disclosure, the absolute value is added because the gradient between the current pixel and the adjacent pixel is independent of positive and negative, but only related to the gradient absolute value.

In an exemplary embodiment of the present disclosure, the vertical gradient may be obtained by only calculating one side of the image (for example, above the pixel, or below the pixel, etc.).

Calculation for gradient threshold $T_{grad}$ of the current pixel: with the current pixel as a center, search for a gradient $\Delta$grad of 16 pixels (calculated by the above formula (6)) on both left and right sides, and select the maximum gradient as the gradient threshold of the current pixel.

$$T_l = \max\left(\frac{\sum_{i=x-w/2}^{x} i(i, y)}{w/2}, T_{grad}\right) \quad (7)$$

$$T_r = \max\left(\frac{\sum_{i=x}^{x+w/2} i(i, y)}{w/2}, T_{grad}\right) \quad (8)$$

According to the maximum gradient threshold $T_{grad}$, $T_l$ and $T_r$ may be calculated with reference to the position of the pixel.

By means of the formula (4), the edge image at the left side of the in-vehicle device (i.e., the first edge image) may be binarized to obtain the first binarized edge image. By means of the formula (5), the edge image at the right side of the in-vehicle device (i.e., the second edge image) may be binarized to obtain the second binarized edge image.

Obviously, in practical applications, the first edge image and the second edge image may be binarized through other methods by those skilled in the art, which are not limited in the exemplary embodiment of the present disclosure.

The exemplary embodiment of the present disclosure can reduce the influence of illumination on feature point extraction by performing the binarization process on the first edge image and the second edge image.

After the first binarized edge image and the second binarized edge image are obtained, step 207 is performed.

Step 207: performing a row scanning for each of the first binarized edge image and the second binarized edge image, and obtaining a first lane line pixel feature point and a second lane line pixel feature point in respective rows.

By performing the row scanning for each of the first binarized edge image and the second binarized edge image, i.e., processing each row of pixels and each pixel in each row of the first binarized image and the second binarized image, a first feature point, i.e., a first lane line pixel feature point, may be obtained from the first binarized edge image, and a second feature point, i.e., a second lane line pixel feature point, may be obtained from the second binarized edge image.

After the matched first lane line pixel feature point and second lane line pixel feature point in each row of the first binarized edge image and the second binarized edge image are extracted, step 208 is performed.

It should be understood that the above steps 205 to 207 correspond to the step 102 described above, that is, the above steps 205 to 207 are subdivided steps of the step 102.

Step 208: copying and saving the first lane line pixel feature point and the second lane line pixel feature point into a new image to obtain a lane line feature map when a distance between the first lane line pixel feature point and the second lane line pixel feature point satisfies a set distance threshold.

When a distance between the matched first lane line pixel feature point and second lane line pixel feature point satisfies a set distance threshold, the pixel feature between the first feature point and the second feature point is also the lane line pixel feature. Thus, the first and second feature points satisfying the set distance threshold are copied and saved to a new image to obtain a lane line feature map.

In an exemplary embodiment of the disclosure, the set distance threshold may be represented by a first threshold and a second threshold. Satisfying the set distance threshold means that the distance value between the matched first lane line pixel feature point and second lane line pixel feature point is between the first threshold and the second threshold. The first threshold and the second threshold are set according to a width of a real lane line. In the image to be detected, the feature points of different positions are different in the width thresholds. The closer a lane line to the in-vehicle device and the larger the width shown in the image, the greater the adopted width threshold. That is, this step determines whether the distance value between the matched first and second lane line pixel feature points is between a first threshold and a second threshold that are associated with positions of the first lane line pixel feature point and the second lane line pixel feature point.

Figure 3B:
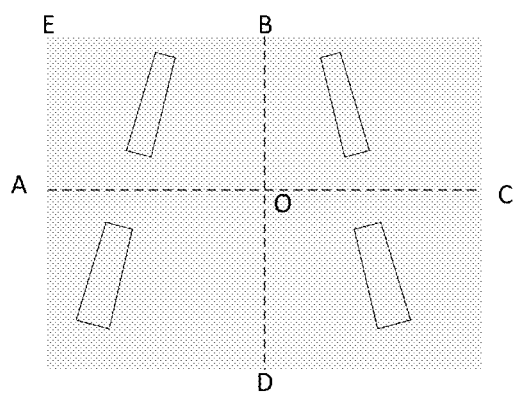
FIG. 3b is a schematic view showing a lane line according to an exemplary embodiment of the present disclosure.

Specifically, the width threshold may be obtained in the following manner:

setting the lane line width to be w in the real coordinate system in which the in-vehicle device is located. Referring to FIG. 3b, a schematic view showing a lane line according to an exemplary embodiment of the present disclosure is shown. The field of view may be divided into two parts, i.e., an upper field and a lower field, i.e., a near field of view and a far field of view. Due to a perspective projection effect of the camera, lane lines with the same width in the real world will have a near-wide and far-narrow effect in the image. Therefore, the near field of view and the far field of view are divided for the purpose of obtaining a more accurate lane line width in the image. The calculation process of the near field of view is: in calculation of the second threshold for the near field of view, assuming that there is a lane line at point D, where the coordinate values of the left and right edges thereof in the world coordinate system are (−w/2,0,0) and (w/2,0,0), respectively; and in calculation of the first threshold for the near field of view, assuming that there is a lane line at point A, where the coordinate values of the left and right edges thereof in the world coordinate system are (−u,v,0) and (−u+w/2,v,0), respectively. The calculation process of the far field of view is: in calculation of the second threshold for the far field of view, assuming that there is a lane line at point 0, where the coordinate values of the left and right edges thereof in the world coordinate system are (−w/2,v,0) and (w/2,v,0), respectively; and in calculation of the first threshold for the far field of view, assuming that there is a lane line at point E, where the coordinate values of the left and right edges thereof in the world coordinate system are (−u,2v,0) and (−u+w/2,2v,0), respectively; where u, v are set by the front lane line detection range, u is 7 m in the left-right direction of the vehicle in the region of interest set in the above example, and v is one-half of the furthest detection distance (e.g. 40 m/2).

After the first threshold and the second threshold are obtained, the first lane line pixel feature point and the second lane line pixel feature point in the first binarized edge image and the second binarized edge image may be matched according to the first threshold and the second threshold. During the row scanning, the first lane line pixel feature point and the second lane line pixel feature point form a pair of lane line feature edge points only when the distance between two lane line pixel feature points is between the first threshold and the second threshold. The pixels between the two points belong to the lane line features, and the matchable left and right feature points (i.e., the distance between the left and right feature points meet the lane line width requirement) are copied and saved into a new image to obtain the final lane line feature map.

The coordinate values of each edge point in the world coordinate system may converted into the image coordinate system as represented by the above formula (1), or may be converted in other manners, which is not limited by the exemplary embodiments of the present disclosure. After the lane line feature map is obtained, step 209 is performed.

Step 209: searching for a superpixel feature from an edge position of the lane line feature map, and using a first found superpixel feature as a superpixel feature reference point.

In an exemplary embodiment of the present disclosure, after the final lane line feature map (i.e., pixel feature map) of the region of interest is obtained, the scanning and combining from bottom to top and from left to right may be performed based on the final lane line feature map, and the first found uncombined feature point is taken as a new superpixel feature reference point.

Figure 3C:
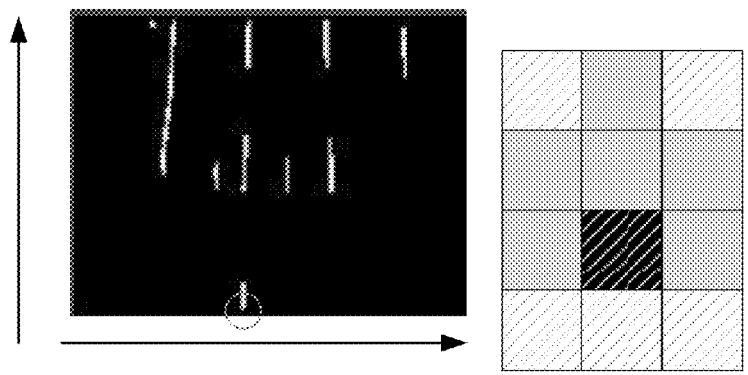
FIG. 3c is a schematic view showing the searching of a superpixel according to an exemplary embodiment of the present disclosure.

The lane line feature map may be searched from bottom to top to use the first found superpixel feature as a superpixel feature reference point. Referring to FIG. 3c, a schematic view showing the searching of a superpixel according to an exemplary embodiment of the present disclosure is shown. As shown in the left half of FIG. 3c, starting from the bottom of a map, a search is first performed from left to right, then from bottom to top, to find a feature point that is not combined and searched in the map (corresponding to white pixel points in the figure, i.e., the portion circled with dotted lines in the left half of FIG. 3c). With this pixel point as the reference point (i.e., corresponding to the black region in the right half of FIG. 3c which represents the first found superpixel feature, namely, this superpixel feature is used as the superpixel feature reference point), step 210 is performed.

Step 210: finding similar features to the superpixel feature reference point within a candidate range of the superpixel feature reference point.

After a superpixel feature reference point is determined, it is possible to find out whether there are similar features in the candidate range of the superpixel feature reference point. In the present disclosure, a row scanning method may be used to find out whether similar features are present. As shown in the right half of FIG. 3c, the black part represents a superpixel feature reference point, while the gray part represents a search range of the superpixel feature reference point which is found for a similar feature. Then, step 211 is performed.

Step 211: combining the superpixel feature reference point with the found similar features to generate the superpixel.

When similar features are found in the candidate range of the superpixel feature reference point, the found similar features are combined into the superpixel feature reference point to generate a superpixel corresponding to the superpixel feature reference point, and then, step 212 is performed.

It should be understood that the above steps 208 to 211 correspond to the step 103 described above, that is, the above steps 208 to 211 are subdivided steps of the step 103.

Step 212: performing a clustering process for the respective superpixels to obtain a plurality of candidate lane lines.

In an exemplary embodiment of the present disclosure, superpixels belonging to the same lane line may be clustered by a clustering method so that a plurality of candidate lane lines may be formed.

In practical applications, those skilled in the art may select a clustering method for clustering superpixels belonging to the same lane line according to actual needs, which is not limited herein by the exemplary embodiments of the present disclosure.

The process of clustering candidate lane lines is performed by the clustering method as follows:

firstly, defining a cluster sample set, i.e., a point set of superpixels $D=(x_1, x_2, x_3, x_4, x_5, \ldots, x_m)$, a neighborhood parameter $(\in, MinPts)$, and a sample distance metric formula:

$$d(u_i, u_j) = \alpha \cdot abs(\theta_{ti} - \theta_{tj}) + \alpha \cdot abs(\theta_{mi} - \theta_{mj}) + \alpha \cdot abs(\theta_{bi} - \theta_{bj}) + \beta \cdot abs(t_i \cdot u - t_j \cdot u) + \beta \cdot abs(m_i \cdot u - m_j \cdot u) + \beta \cdot abs(b_i \cdot u - b_j \cdot u),$$

where $d(u_i, u_j)$ represents a distance between superpixels $u_i$ and represents a gradient direction angle of a top pixel point ti of the superpixel u $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents a gradient direction angle of a top pixel point tj of the superpixel $u_j$, $\theta_{mj}$ represents a gradient direction angle of a middle pixel point mj of the superpixel $u_j$, $\theta_{bj}$ represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

Figure 3D:
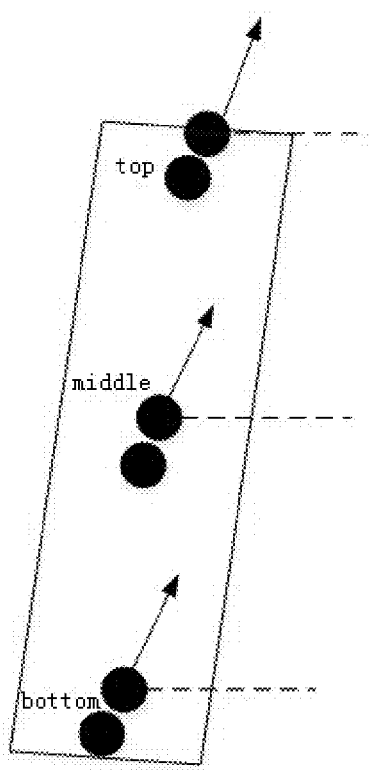
FIG. 3d is a schematic view showing a superpixel gradient direction according to an exemplary embodiment of the present disclosure.

The gradient direction of the superpixel in the exemplary embodiment of the present disclosure will be described in detail below with reference to FIG. 3d. FIG. 3d is a schematic view showing a superpixel gradient direction according to an exemplary embodiment of the present disclosure. As shown in FIG. 3d, top, middle, and bottom are pixel points at which the superpixel is at the top, the middle, and the bottom, respectively. The gradient direction of the top point refers to a direction of a connecting line from a pixel point at a middle position in a next row of the top point to the top point in the superpixel; the gradient direction of the middle point refers to a direction of a connecting line from a pixel point at a middle position in a next row of the middle point to the middle point in the superpixel; and the gradient direction of the bottom point refers to a direction of a connecting line from a pixel point at a middle position in a previous row of the middle point to the bottom point in the superpixel.

The specific process may refer to the following steps:

(1) initializing a core object set $\Omega=\phi$, initializing the number of clustered lane lines K=0, initializing an unvisited superpixel sample set F=D, and a lane lines division C=0; where C is a set;

(2) finding the core objects of all superpixels for each of the superpixel points j=1, 2, ..., m according to steps a)-b) below:

a) finding a $\in$-neighborhood superpixel point subset $N_\epsilon(u_j)$ for the superpixel point $u_j$ according to the distance metric formula;

b) adding the superpixel point $u_j$ to the core object set $\Omega=\Omega\cup\{u_j\}$ if the number of superpixel point subsets satisfies $|N_\epsilon(u_j)|\geq$Minpts;

(3) ending the algorithm if the core object $\Omega=\phi$, otherwise proceeding to step (4);

(4) randomly selecting a core object o in the core object set Q, initializing a current cluster core object queue $\Omega_{cur}=\{o\}$, (in this disclosure, each candidate lane line corresponds to a cluster), initializing a category number, k=k+1, initializing a current cluster sample set $C_k=\{o\}$, and updating an unvisited sample set $\Gamma=\Gamma-\{o\}$.

(5) completing generation of the current cluster $C_k$ if the current cluster core object queue $\Omega_{cur}=\phi$, updating a cluster division $C=\{C_1, C_2, C_3, \ldots, C_k\}$, updating the core object set $\Omega=\Omega-C_k$, and proceeding to step (3);

(6) taking a core object o' out of the current cluster core object queue $\Omega_{cur}$, finding all E neighborhood sample subsets $N_\in(o')$, $\Delta=N_\in(o')\cap\Gamma$, through a neighborhood distance threshold $\in$, updating the current cluster sample set $C_k=C_k\cup\Delta$, updating the unvisited sample set $\Gamma=\Gamma-\Delta$, and proceeding to step (5);

(7) outputting the cluster division result $C=C=\{C_1, C_2, C_3, \ldots, C_k\}$, and using the cluster division result as a candidate lane line.

Obviously, in practical applications, those skilled in the art may adopt other clustering methods for clustering superpixels belonging to the same lane line, which is not limited herein by the exemplary embodiments of the present disclosure.

Step 213: calculating a length value of each of the candidate lane lines.

After a plurality of candidate lane lines are obtained, the length values of the candidate lane lines may be calculated.

Step 214: performing a quadratic curve fitting for each of the candidate lane lines whose length value is greater than a set threshold to obtain a target lane line.

The set threshold is set according to the actual situation of the road, which is not limited in the present disclosure.

In the exemplary embodiment of the present disclosure, the length value of each candidate lane line is compared with the set threshold, thus reducing interference with other factors on road and the probability of false detection of the lane line.

After the length value is compared with the set threshold, a quadratic curve fitting (i.e., quadratic equation fitting) may be performed for each candidate lane line whose length value is greater than the set threshold, so as to form a curve expression of the target lane line, thereby obtaining the target lane line.

In practical applications, the lane line includes a straight line and a curve. Using the quadratic equation can better fit the curve expression form of the target lane line, thereby obtaining the target lane line.

It should be understood that the above steps 212 to 214 correspond to the step 104 described above, that is, the above steps 212 to 214 are subdivided steps of the step 104.

The lane line detection method provided in the exemplary embodiment of the present disclosure may be used for an in-vehicle device, and may determine a region of interest in an image to be detected, extract each lane line pixel feature in the region of interest, combine similar lane line pixel features to generate a superpixel corresponding to the combined lane line pixel features, and perform a clustering and fitting process for each superpixel to obtain a target lane line. The exemplary embodiment of the present disclosure generates the target lane line based on superpixels, which does not require any assumption about lane line and road models, and does not rely on the assumption of parallel lane lines; it may work robustly in an urban environment without interference with a front vehicle, thereby reducing a probability of missed or false detection during the lane line detection.

Figure 4:
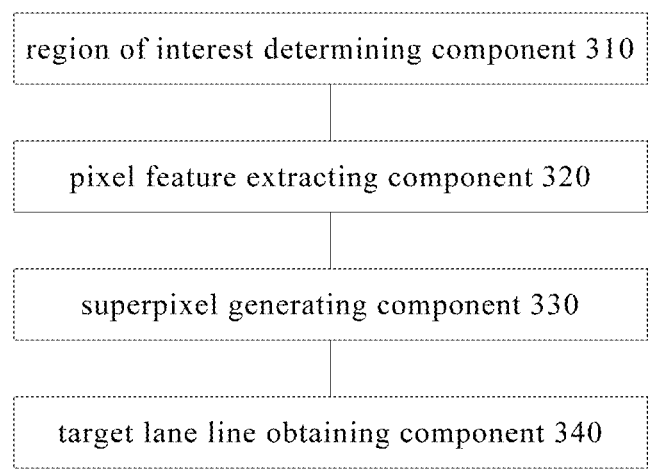
FIG. 4 is a structural schematic view showing a lane line detection apparatus according to an exemplary embodiment of the disclosure.

FIG. 4 is a structural schematic view showing a lane line detection apparatus according to an exemplary embodiment of the disclosure. As shown in FIG. 4, the lane line detection apparatus may specifically include:

a region of interest determining component 310 configured to determine a region of interest in an image to be detected; a pixel feature extracting component 320 configured to extract lane line pixel features in the region of interest; a superpixel generating component 330 configured to combine similar lane line pixel features to generate a superpixel corresponding to the combined lane line pixel features; and a target lane line obtaining component 340 configured to perform a clustering and fitting process for respective superpixels to obtain a target lane line.

In an exemplary embodiment of the disclosure, the region of interest determining component 310 includes: a processing region setting sub-component configured to set a lane line processing region around the in-vehicle device; a coordinate value determining sub-component configured to determine coordinate values of a midpoint on each of boundary lines of the lane line processing region in a real coordinate system in which the in-vehicle device is located; an image coordinate value obtaining sub-component configured to convert each of the coordinate values into a corresponding image coordinate value in an image coordinate system corresponding to the image to be detected; and a region of interest determining sub-component configured to determine the region of interest in the image to be detected according to the respective image coordinate values.

In an exemplary embodiment of the disclosure, the pixel feature extracting component 320 includes: an edge image selecting sub-component configured to select a first edge image and a second edge image in the region of interest; a binarization processing sub-component configured to perform a binarization process for each of the first edge image and the second edge image to obtain a first binarized edge image and a second binarized edge image; and a scan processing sub-component configured to perform a row scanning for each of the first binarized edge image and the second binarized edge image, and obtain a first lane line pixel feature point and a second lane line pixel feature point in respective rows.

In an exemplary embodiment of the disclosure, the superpixel generating component 330 includes: a lane line feature map obtaining sub-component configured to copy and save the first lane line pixel feature point and the second lane line pixel feature point into a new image to obtain a lane line feature map when a distance between the first lane line pixel feature point and the second lane line pixel feature point satisfies a set distance threshold; a reference point selecting sub-component configured to search for a superpixel feature from an edge position of the lane line feature map, and use a first found superpixel feature as a superpixel feature reference point; a finding sub-component configured to find similar features to the superpixel feature reference point within a candidate range of the superpixel feature reference point; and a superpixel generating sub-component configured to combine the superpixel feature reference point with the found similar features to generate the superpixel.

In an exemplary embodiment of the disclosure, the target lane line obtaining component 340 includes: a clustering and fitting processing sub-component configured to perform a clustering process for the respective superpixels to obtain a plurality of candidate lane lines; a length value calculating sub-component configured to calculate a length value of each of the candidate lane lines; and a target lane line obtaining sub-component configured to perform a quadratic curve fitting for each of the candidate lane lines whose length value is greater than a set threshold to obtain a target lane line.

In an exemplary embodiment of the disclosure, the binarization processing sub-component is configured to compare pixel values of the first edge image and the second edge image to a pixel threshold which is associated with positions and/or vertical gradient of the pixels in the first edge image and the second edge image.

In an exemplary embodiment of the disclosure, the lane line feature map obtaining sub-component is configured to determine whether a distance value between the matched first and second lane line pixel feature points is between a first threshold and a second threshold that are associated with positions of the first lane line pixel feature point and the second lane line pixel feature point.

In an exemplary embodiment of the disclosure, the clustering and fitting processing sub-component defines the following sample distance metric formula to perform the clustering and fitting process:

$$d(u_i,u_j)=\alpha \cdot abs(\theta_{ti}-\theta_{tj})+\alpha \cdot abs(\theta_{mi}-\theta_{mj})+\alpha \cdot abs(\theta_{bi}-\theta_{bj})+\beta \cdot abs(t_i u-t_j u)+\beta \cdot abs(m_i u-m_j u)+\beta \cdot abs(b_i u-b_j u),$$

where $d(u_i, u_j)$ represents a distance between superpixels $u_i$ and $u_j$, $\theta_{ti}$ represents a gradient direction angle of a top pixel point ti of the superpixel $u_i$, $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents a gradient direction angle of a top pixel point tj of the superpixel $u_j$, $\theta_{mj}$ represents a gradient direction angle of a middle pixel point mj of the superpixel $u_j$, $\theta_{bj}$ represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

In an exemplary embodiment of the present disclosure, the region of interest determining component 310, the pixel feature extracting component 320, the superpixel generating component 330, the target lane line obtaining component 340, and subcomponents thereof may be implemented by a DSP chip or an embedded chip, or any other device or processing circuit capable of data processing.

It should be understood that the lane line detection apparatus provided by the present disclosure corresponds to the lane line detection method provided by the present disclosure. For description about other aspects of the lane line detection apparatus, reference may be made to the above description about the lane line detection method, which is not repeated herein.

The lane line detection apparatus provided in the exemplary embodiment of the present disclosure may determine a region of interest in an image to be detected, extract each lane line pixel feature in the region of interest, combine similar lane line pixel features to generate a superpixel corresponding to the combined lane line pixel features, and perform a clustering and fitting process for each superpixel to obtain a target lane line. The exemplary embodiment of the present disclosure generates the target lane line based on superpixels, which does not require any assumption about lane line and road models, and does not rely on the assumption of parallel lane lines; it may work robustly in an urban environment without interference with a front vehicle, thereby reducing a probability of missed or false detection during the lane line detection.

For the sake of brevity, the foregoing method embodiments are all described as a series of combinations of actions, but those skilled in the art should understand that the present disclosure is not limited by the described order of actions, because according to the present disclosure, some steps may be performed in other orders or at the same time. In addition, those skilled in the art should also understand that the embodiments described in the description are all preferred embodiments, and the acts and components involved are not necessarily required by the present disclosure.

The various embodiments in the present description are all described in a progressive manner, and each embodiment focuses on differences from other embodiments, and thus the same or similar parts between the various embodiments may be referred to each other.

Finally, it should also be noted that, in this context, relational terms such as first and second, are used merely to distinguish one entity or operation from another without necessarily requiring or implying that there is any such actual relationship or order between such entities or operations. Moreover, the term "comprise," "comprising" or any variant thereof means to be non-exclusive so that a process, method, item or device including a series of elements includes not only said elements, but also other elements not explicitly listed, or inherent elements of such processes, methods, items or devices. In the absence of more limitations, an element defined by "includes a . . . " do not exclude the existence of additional identical elements in the process, method, item or device including the element.

The above is a detailed description of the lane line detection method and the lane line detection apparatus provided by the present disclosure. The principles and implementations of the present disclosure are set forth through exemplary embodiments herein, and the description of the exemplary embodiments is only to assist in understanding the method of the present disclosure and its core ideas. At the same time, for those ordinary skilled in the art, there will be changes in the specific embodiments and application scopes based on the ideas of the present disclosure. In conclusion, the content of the description should not be construed as limiting the disclosure.

What is claimed is:

1. A lane line detection method applicable for an in-vehicle device and comprising:
   determining a region of interest in an image to be detected;
   extracting lane line pixel features in the region of interest;
   combining similar lane line pixel features to generate superpixels corresponding to the combined lane line pixel features; and
   performing a clustering and fitting process for the superpixels to obtain a target lane line,
   wherein the step of determining the region of interest in the image to detected comprises:
   setting a lane line procxing region around the in-vehicle device;

determining coordinate values of a midpoint on each of boundary lines of the lane line processing region in a real coordinate system in which the in-vehicle device is located;

converting each of the coordinate values into a corresponding image coordinate value in an image coordinate system corresponding to the image to be detected; and determining the region of interest in the image to be detected according to the respective image coordinate values.

2. The method according to claim 1, wherein the step of extracting the lane line pixel features in the region of interest comprises:

selecting a first edge image and a second edge image in the region of interest;

performing a binarization process for each of the rust edge image and the second edge image to obtain a first binarized edge image and a second binarized edge image; and performing a mw scanning for each of the rust binarized edge image and the second binarized edge image, and obtaining a rust lane line pixel feature point and a second lane line pixel feature point in respective rows.

3. The method according to claim 2, wherein the step of combining the similar lane line pixel features to generate the superpixel corresponding to the combined lane line pixel features comprises:

copying and saving the first lane line pixel feature point and the second lane line pixel feature point into a new image to obtain a lane line feature map when a distance between the first lane line pixel feature point and the second lane line pixel feature point satisfies a set distance threshold;

searching for a superpixel feature from an edge position of the lane line feature map, and using a first found superpixel feature as a superpixel feature reference point;

finding similar features to the superpixel feature reference point within a candidate range of the superpixel feature reference point; and combining the superpixel feature reference point with the found similar features to generate the superpixel.

4. The method according to claim 1, wherein the step of performing the clustering and fitting process for the respective superpixels to obtain the target lane line comprises:

performing a clustering process for the respective superpixels to obtain a plurality of candidate lane lines;

calculating a length value of each of the candidate lane lines; and performing a quadratic curve fitting for each of the candidate lane lines whose length value is greater than a set threshold to obtain a target lane line.

5. The method according to claim 2, wherein the binarization process includes comparing pixel values of the first edge image and the second edge image to a pixel threshold which is associated with positions of the pixels in the first edge image and the second edge image.

6. The method according to claim 5, wherein the pixel threshold is also associated with a vertical gradient of the pixels in the first edge image and the second edge image.

7. The method according to claim 3, wherein it is determined whether a distance value between the matched first and second lane line pixel feature points is between a first threshold and a second threshold that are associated with positions of the first lane line pixel feature point and the second lane line pixel feature point.

8. The method according to claim 4, wherein the following sample distance metric formula is defined to perform the clustering and fitting process:

$$d(u_i, u_j) = \alpha \cdot abs(\theta_{ti} - \theta_{tj}) + \alpha \cdot abs(\theta_{mi} - \theta_{mj}) + \alpha \cdot abs(\theta_{bi} - \theta_{bj}) + \beta \cdot abs(t_i \cdot u - t_j \cdot u) + \beta \cdot abs(m_i \cdot u - m_j \cdot u) + \beta \cdot abs(b_i \cdot u - b_j \cdot u),$$

where $d(u_i, u_j)$ represents a distance between superpixels $u_i$ and $u_j$, $\theta_{ti}$ represents a gradient direction angle of a top pixel point ti of the superpixel $u_i$, $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents agradient direction angle of a top pixel point tj of the superpixel $u_j$, $\theta_{mj}$ represents a gradient direction angle of a middle pixel point mj of the superpixel $u_j$, $\theta_{bj}$ a represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

9. A lane line detection apparatus, comprising:

a region of interest determining component configured to determine a region of interest in an image to be detected;

a pixel feature extracting component configured to extract lane line pixel features in the region of interest;

a superpixel generating component configured to combine similar lane line pixel features to generate superpixels corresponding to the combined lane line pixel features; and a target lane line obtaining component configured to perform a clustering and fitting process for the superpixels to obtain a target lane line, wherein the region of interest determining component comprise:

a processing region setting sub-component configured to set a lane line processing region around the in-vehicle device;

a coordinate value determining sub-component configured to determine coordinate values of a midpoint on each of boundary lines of the lane line processing region in a real coordinate system in which the in-vehicle device is located;

an image coordinate value obtaining sub-component configured to convert each of the coordinate values into a corresponding image coordinate value in an image coordinate system corresponding to the image to be detected; and a region of interest determining sub-component configured to determine the region of interest in the image to be detected according to the respective image coordinate values.

10. The apparatus according to claim 9, wherein the pixel feature extracting component includes:

an edge image selecting sub-component configured to select a first edge image and a second edge image in the region of interest;

a binarization processing sub-component configured to perform a binarization process for each of the first edge image and the second edge image to obtain a first binarized edge image and a second binarized edge image; and a scan processing sub-component configured to perform a row scanning for each of the first binarized edge image and the second binarized edge image, and obtain a first lane line pixel feature point and a second lane line pixel feature point in respective rows.

11. The apparatus according to claim 10, wherein the superpixel generating component comprises:

a lane line feature map obtaining sub-component configured to copy and save the first lane line pixel feature point and the second lane line pixel feature point into a new image to obtain a lane line feature map when a distance between the first lane line pixel feature point and the second lane line pixel feature point satisfies a set distance threshold;

a reference point selecting sub-component configured to search for a superpixel feature from an edge position of the lane line feature map, and use a first found superpixel feature as a superpixel feature reference point;

a finding sub-component configured to find similar features to the superpixel feature reference point within a candidate range of the superpixel feature reference point; and a superpixel generating sub-component configured to combine the superpixel feature reference point with the found similar features to generate the superpixel.

12. The apparatus according to claim 9, wherein the target lane line obtaining component comprises:

a clustering and fitting processing sub-component configured to perform a clustering process for the respective superpixels to obtain a plurality of candidate lane lines;

a length value calculating sub-component configured to calculate a length value of each of the candidate lane lines; and a target lane line obtaining sub-component configured to perform a quadratic curve fitting for each of the candidate lane lines whose length value is greater than a set threshold to obtain a target lane line.

13. The apparatus according to claim 10, wherein the binarization processing sub-component is configured to compare pixel values of the first edge image and the second edge image to a pixel threshold which is associated with positions of the pixels in the first edge image and the second edge image.

14. The apparatus according to claim 13, wherein the pixel threshold is also associated with a vertical gradient of the pixels in the first edge image and the second edge image.

15. The apparatus according to claim 11, wherein the lane line feature map obtaining sub-component is configured to determine whether a distance value between the matched first and second lane line pixel feature points is between a first threshold and a second threshold that are associated with positions of the first lane line pixel feature point and the second lane line pixel feature point.

16. The apparatus according to claim 12, wherein the clustering and fitting processing sub-component defines the following sample distance metric formula to perform the clustering and fitting process:

$$d(u_i, u_j) = \alpha \cdot abs(\theta_{ti} - \theta_{tj}) + \alpha \cdot abs(\theta_{mi} - \theta_{mj}) + \alpha \cdot abs(\theta_{bi} - \theta_{bj}) + \beta \cdot abs(t_i \cdot u - t_j \cdot u) + \beta \cdot abs(m_i \cdot u - m_j \cdot u) + \beta \cdot abs(b_i \cdot u - b_j \cdot u),$$

where $d(u_i, u_j)$ represents a distance between superpixels $u_i$ and $uj_j$, $\theta_{ti}$ represents a gradient direction angle of a top pixel point ti of the superpixel $u_i$, $\theta_{mi}$ represents a gradient direction angle of a middle pixel point mi of the superpixel $u_i$, $\theta_{bi}$ represents a gradient direction angle of a bottom pixel point bi of the superpixel $u_i$, $\theta_{tj}$ represents a gradient direction angle of a top pixel point tj of the superpixel $u_j$, $\theta_{mj}$ represents a gradient direction angle of a middle pixel point mj of the superpixel $u_j$, $\theta_{bj}$ a represents a gradient direction angle of a bottom pixel point bj of the superpixel $u_j$, $\alpha$ represents the weight of angle, $\beta$ represents the weight of distance, $\alpha$ and $\beta$ represent a preset fixed value, abs represents calculating an absolute value, $t_i \cdot u$ represents an abscissa of the top pixel point ti, $m_i \cdot u$ represents an abscissa of the middle pixel point mi, $b_i \cdot u$ represents an abscissa of the bottom pixel point bi, $t_j \cdot u$ represents an abscissa of the top pixel point tj, $m_j \cdot u$ represents an abscissa of the middle pixel point mj, and $b_j \cdot u$ represents an abscissa of the bottom pixel point bj.

* * * * *